(12) United States Patent
Kelley et al.

(10) Patent No.: US 6,728,712 B1
(45) Date of Patent: Apr. 27, 2004

(54) SYSTEM FOR UPDATING INTERNET ADDRESS CHANGES

(75) Inventors: Edward E. Kelley, Wappingers Falls, NY (US); Norman J. Dauerer, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 08/978,012

(22) Filed: Nov. 25, 1997

(51) Int. Cl.$^7$ ............................................... G06F 17/30
(52) U.S. Cl. ......................................... 707/10; 707/200
(58) Field of Search ........................... 707/10, 200, 9; 395/200.5, 653; 709/203

(56) References Cited

U.S. PATENT DOCUMENTS

| | | | | |
|---|---|---|---|---|
| 4,635,189 A | * | 1/1987 | Kendall | 364/200 |
| 4,763,356 A | | 8/1988 | Day, Jr. et al. | 379/368 |
| 5,530,759 A | | 6/1996 | Braudaway et al. | 380/54 |
| 5,647,056 A | | 7/1997 | Barrett et al. | 395/200.5 |
| 5,724,510 A | * | 3/1998 | Arndt et al. | 395/200.5 |
| 5,826,253 A | * | 10/1998 | Bredenberg | 707/2 |
| 5,829,001 A | * | 10/1998 | Li et al. | 707/10 |
| 5,841,972 A | * | 11/1998 | Fanshier | 395/200.5 |
| 5,842,196 A | * | 11/1998 | Agarwal et al. | 707/2 |
| 5,855,020 A | * | 12/1998 | Kirsch | 707/10 |
| 5,872,524 A | * | 2/1999 | Iida | 340/825.52 |
| 5,890,172 A | * | 3/1999 | Borman et al. | 707/501 |
| 5,907,681 A | * | 5/1999 | Bates et al. | 395/200.58 |
| 5,933,604 A | * | 8/1999 | Inakoshi | 395/200.56 |
| 5,978,842 A | * | 11/1999 | Noble et al. | 709/218 |

OTHER PUBLICATIONS

Canon Internet Web Page, www.ccsi.canon.com/webrecord/, Apr. 24, 1997.
IBM Technical Disclosure Bulletin, "TEMPORARY GLOBAL PASSWORDS", vol. 36, No. 03, Mar. 1993; pp. 451–453.
IBM Technical Disclosure Bulletin, "Resource Access Control Facility Password Propagation For Multiple Virtual Storage", vol. 36, No. 06B, Jun. 1993.
IBM Technical Disclosure Bulletin, "Network Signon Coordination Configuration", vol. 36, No. 12, Dec. 1993.

* cited by examiner

Primary Examiner—Greta Robinson
(74) Attorney, Agent, or Firm—DeLio & Peterson LLC; Peter W. Peterson; Margaret A. Pepper

(57) ABSTRACT

A process and system for updating desired inter- or intra-net addresses at a client computer. There is provided a plurality of client computers, a database accessible by each of the client computers, a network server through which the client computers may access files on a network, and a database accessible by the network server. The client computer database includes a list of addresses for accessing desired files on the network. The network server database includes a list of addresses for the desired files on the network and addresses of the client computers that have accessed the desired files on the network. The process comprises updating in the network server database at least one of the addresses for the desired files on the network and transferring from the network server database to the database of the client computers having addresses in the network server database the updated at least one of the addresses for the desired files on the network.

20 Claims, 5 Drawing Sheets

SYSTEM FOR UPDATING INTERNET ADDRESS CHANGES

BACKGROUND OF THE INVENTION

1. Field of the Invention

The present invention relates to computer programs and in particular to software for updating desired inter- or intra-net addresses at a client computer.

2. Description of Related Art

When accessing web URL (uniform resource locator) addresses through a web browser, there is a function to store the web address or URL on a file called a "bookmark" file. The purpose of this data file is to make it easier to reaccess the web address for frequently used web sites or pages. The client computer user does not have to remember the address, but can simply look up the address and select it using a mouse-controlled cursor and the connection to the web server is automatically made.

Problem arise when a web address or URL is changed. Such web addresses may be changed at any time by the owner of the web page or file. When a web client computer attempts to contact the old address, in some instances the old file may be maintained to provide the new file address. In other instances, a "file not found" or similar error message is received at the client, and no information is given as to the new address, and the client computer must make a new, manual search to find the new location.

There is presently no way to have the bookmark file of a web browser automatically changed. The client computer user has to first, know that the address has changed, second, look up the address and third, change it to the correct address in the bookmark file.

Bearing in mind the problems and deficiencies of the prior art, it is therefore an object of the present invention to provide a process and system for updating desired inter- or intra-net addresses at a client computer.

It is another object of the present invention to update desired inter- or intra-net addresses in a manner which tracks changes in such addresses.

A further object of the invention is to update the desired inter- or intra-net addresses without prompting from the client computer.

It is yet another object of the present invention to provide a process and system which permits verification to a client computer of updates of the desired inter- or intranet addresses.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a process for updating desired inter- or intra-net addresses at a client computer. There is provided a plurality of client computers, a database accessible by each of the client computers, a network server through which the client computers may access files on a network, and a database accessible by the network server. The client computer database includes a list of addresses for accessing desired files on the network. The network server database includes a list of addresses for the desired files on the network and addresses of the client computers that have accessed the desired files on the network. The process comprises updating in the network server database at least one of the addresses for the desired files on the network and transferring from the network server database to the database of the client computers having addresses in the network server database the updated at least one of the addresses for the desired files on the network.

Between the steps of updating the network server database and transferring the addresses to the client computer database, the process may include initiating a connection from the network server to the client computers having addresses in the network server database. The network connection from the client computers having addresses in the network server to the network server is then validated to ensure the identity of the network server.

The database accessible by the client computers may initially contain a first address of a desired file on the network, such that in the update transferring step, the address of the desired file is changed to a second, updated address. In this instance, the process may further include initiating a connection from the client computers having addresses in the network server database to the network server and transferring from the client computers having addresses in the network server to the network server acknowledgment of the change of the address of the desired file.

There may be first and second databases accessible by the client computers, such that the first database initially contains an address of a desired file on the network, and the updated address for the desired files on the network is transferred to the second database. Thereafter, the updated address of the desired file may be transferred from the second database to the first database.

In the preferred embodiment, a change file is created for new addresses for the desired files after receiving notification of new addresses from owners of the desired files and prior to updating the database in the network server.

In another aspect, the present invention provides a system for updating desired inter- or intra-net addresses at a client computer comprising a plurality of client computers and a network server through which the client computers may access files on a network. A database accessible by each of the client computers contains a list of addresses for accessing desired files on the network. A database accessible by the network server contains a list of addresses for the desired files on the network and addresses of the client computers that have accessed the desired files on the network. The network server database is adapted to update the addresses for the desired files on the network and transfer to the database of the client computers having addresses in the network server database the updated addresses for the desired files on the network.

The database accessible by the client computers may be adapted to initially contain a first address of a desired file on the network. Upon transfer of updated addresses from the network server database, the database of the client computers is adapted to change the address of the desired file to a second, updated address.

The system may include first and second databases accessible by the client computers. The first database is adapted to initially contain an address of a desired file on the network. Upon transfer of updated addresses from the network server database, the updated address for the desired files on the network is adapted to be transferred to the second database.

The system may further include in the network server database a change file for new addresses for the desired files accessible prior to updating addresses in the database in the network server.

In a further aspect, the present invention provides a program storage device readable by a machine, tangibly embodying a network server database containing files accessible by a plurality of client computers. The client computers each have a database containing a list of addresses for accessing desired files on the network. The device further has a program of instructions executable by the machine to perform a method of updating desired inter- or intra-net addresses at a client computer. The method comprises first providing in the network server database a list of addresses for the desired files on the network and addresses of the client computers that have accessed the desired files on the network. Thereafter, the method includes updating in the network server database at least one of the addresses for the desired files on the network and transferring from the network server database to the database of the client computers having addresses in the network server database the updated at least one of the addresses for the desired files on the network.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
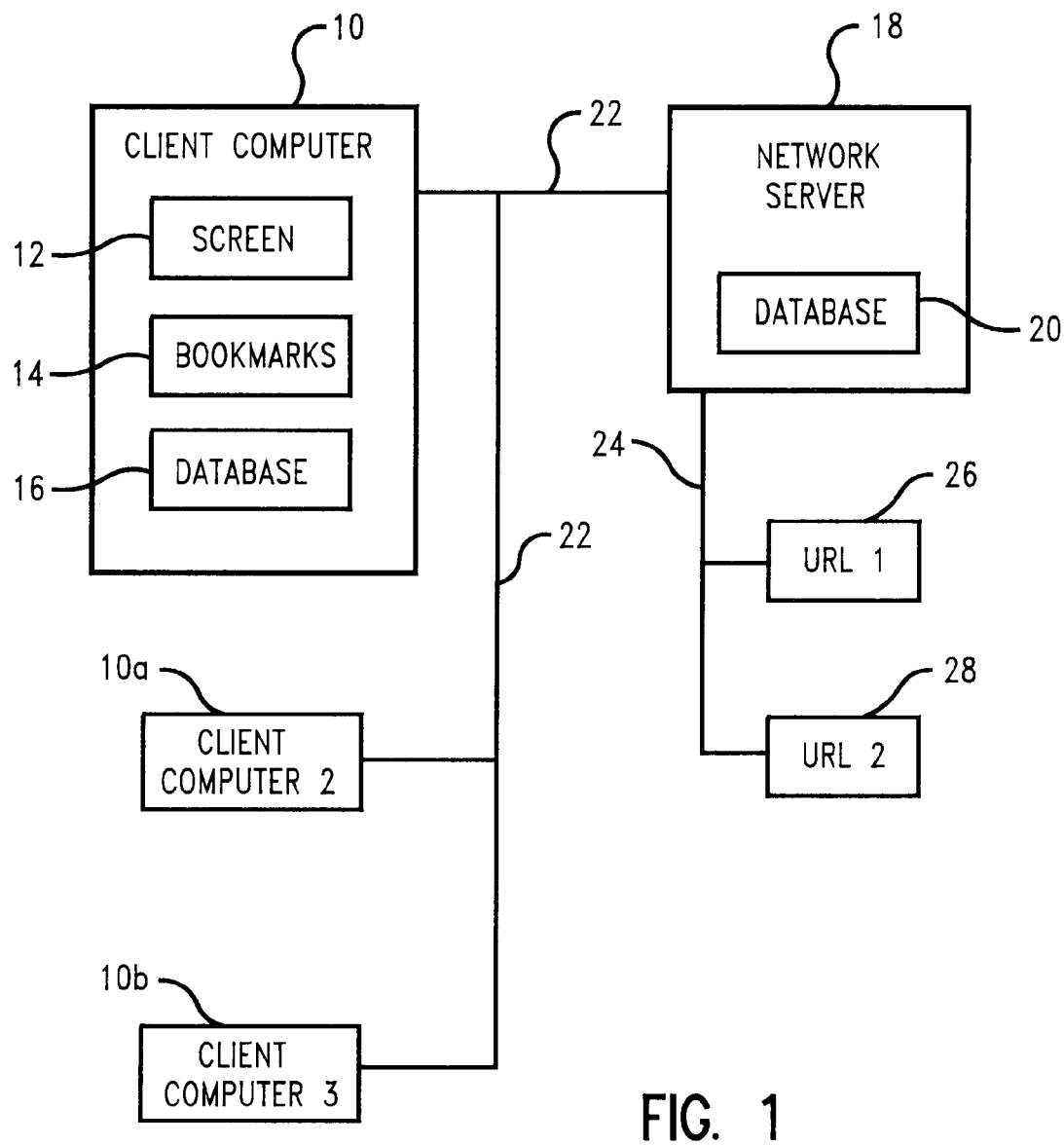
FIG. 1 is a schematic of the system of the present invention for updating desired inter- or intra-net addresses at a client computer.

In describing the preferred embodiment of the present invention, reference will be made herein to FIGS. 1–5 of the drawings in which like numerals refer to like features of the invention. Features of the invention are not necessarily shown to scale in the drawings.

The invention provides a method and system which automatically updates the web address or URL in the bookmark file of a client computer's web browser when a web address is changed. This invention utilizes information from the network server in identifying the users of a particular web address. The invention then provides a function to change and update the bookmark file on the client computer web browser. The invention also provides a function for the network server to keep track of unique URLs accessed by client computers. It accepts transactions at the server to notify the server of changes to the URLs on web pages maintained by the server. The invention further provides a mechanism for the server to make a list of unique URLs for each client and to write the list on the client computer's program storage device. The client computer may manually or automatically initiate the bookmark change program.

A typical client/network system is illustrated in FIG. 1. Client computers 10, 10a, 10b are linked by telephone or other network cable 22 to a network server computer 18 which contains database 20. Such server or database may be on the Internet or on an intranet system. Client computer 10 has a microprocessor for executing stored programs and includes first and second databases 14, 16, respectively, on its program storage device for storage of addresses of HTML web pages and other files which may be downloaded from a network service provider. Database 14 is conventionally referred to a bookmark database, having addresses of often-used web pages or files 26, 28 having different addresses (URLs) and accessible 24 through network server 18. As will be explained further, database 16 contains the updated addresses of the files listed on the client bookmark, and the updated addresses are used to make changes to the bookmark database 14. Preferably, both databases 14, 16 are physically present in the client computers, but they may be located elsewhere, so long as the client computer has access to the information therein.

Network server database 20 contains a list of the addresses of each client computer which have accessed a particular file on the network. The network server may also include a database having a change file for tracking new addresses for the desired files prior to updating database 20 in the network server. This change file is created by the server after it receives a record of a new URL from the owner of the web page changing its old URL.

The computer program or software incorporating the process steps and instructions described further below may be stored in both the client computer(s) and network server on an otherwise conventional program storage device, such as a semiconductor chip, a read-only memory, or magnetic media such as a diskette or computer hard drive, which is readable and executable by a computer in conjunction with a web browser such as Netscape Navigator. A screen 12 is able to display the desired web pages or other files accessed from the network.

Definitions relevant to the present invention are as follows:

HTML—Hypertext Markup Language.

HTML source file—file with the HTML tags to be converted by a web browser to be displayed on a monitor.

URL—Uniform resource locator.

History list—This is a list of client URL accesses built by the server. This list is periodically pruned when the number of client accesses reaches a certain size.

Address files—These files are the files that have been written to the clients' storage by the server and contain the old URLs and the new URLs.

Bookmark files—These files contain addresses of URLs and are found on web browsers that are on the client computers.

UL—this is a unique list of client addresses for each URL that is that has been accessed by the client on the server.

Unique history list—A list of unique addresses of clients that have accessed the server. This list is built from the history list and periodically pruned.

URL txn—This is a transaction to update the URL Change file when a URL change has taken place. This does not physically change the URL in the server HTML source files, but indicates that a change has been accomplished.

URL change file—This is a file that contains a list of URLs that have changed. The old URL and the new URL are listed in the same record in the file.

Flow charts of the process used in the present invention is shown in FIGS. 2–5. Numerals in circles indicate connections to and from other parts of the flow chart.

Figure 2:
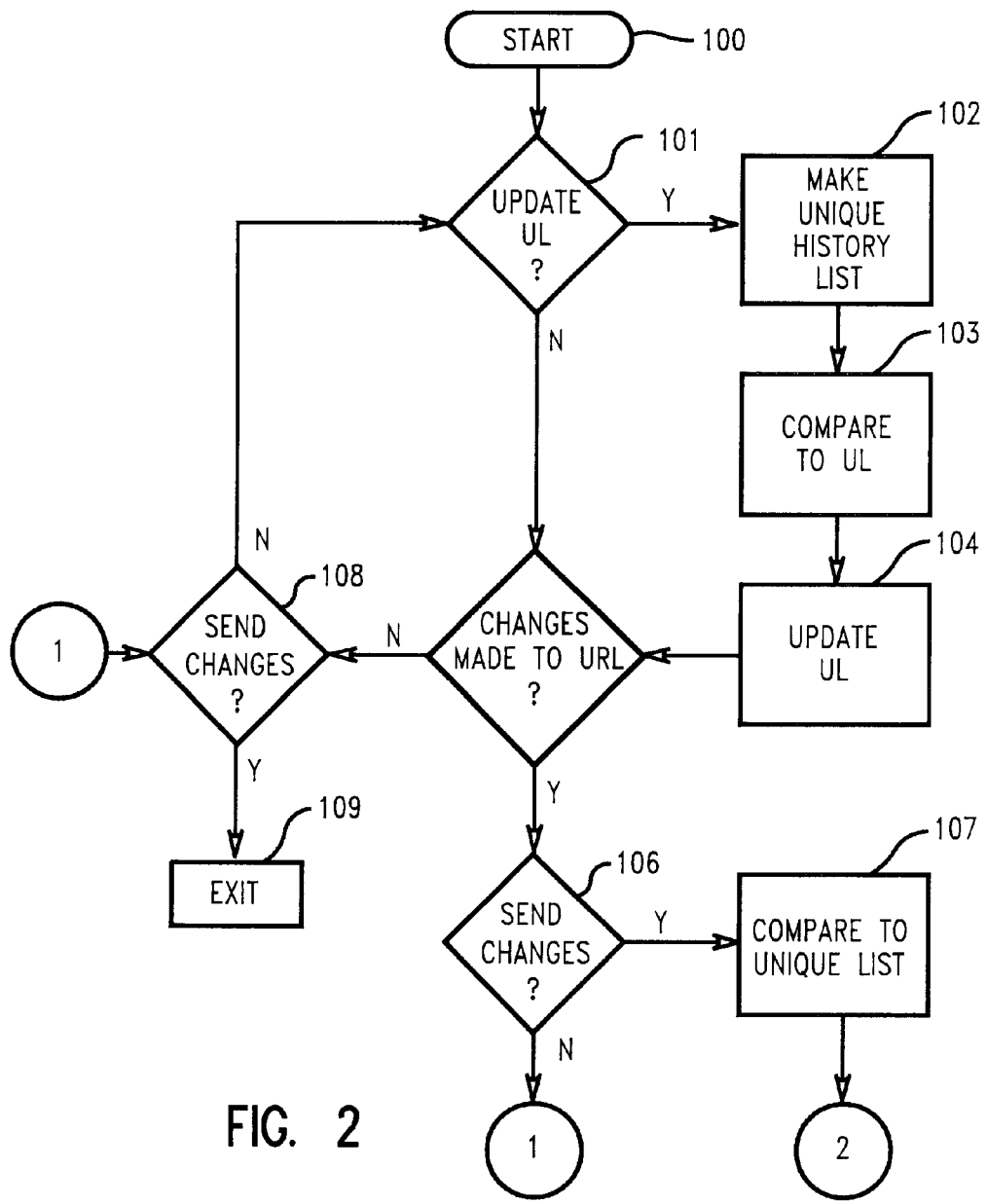
FIGS. 2–5 are block diagram flow charts of the preferred steps employed in practicing the present invention, wherein circled numerals indicate links between the steps.
Figure 3:
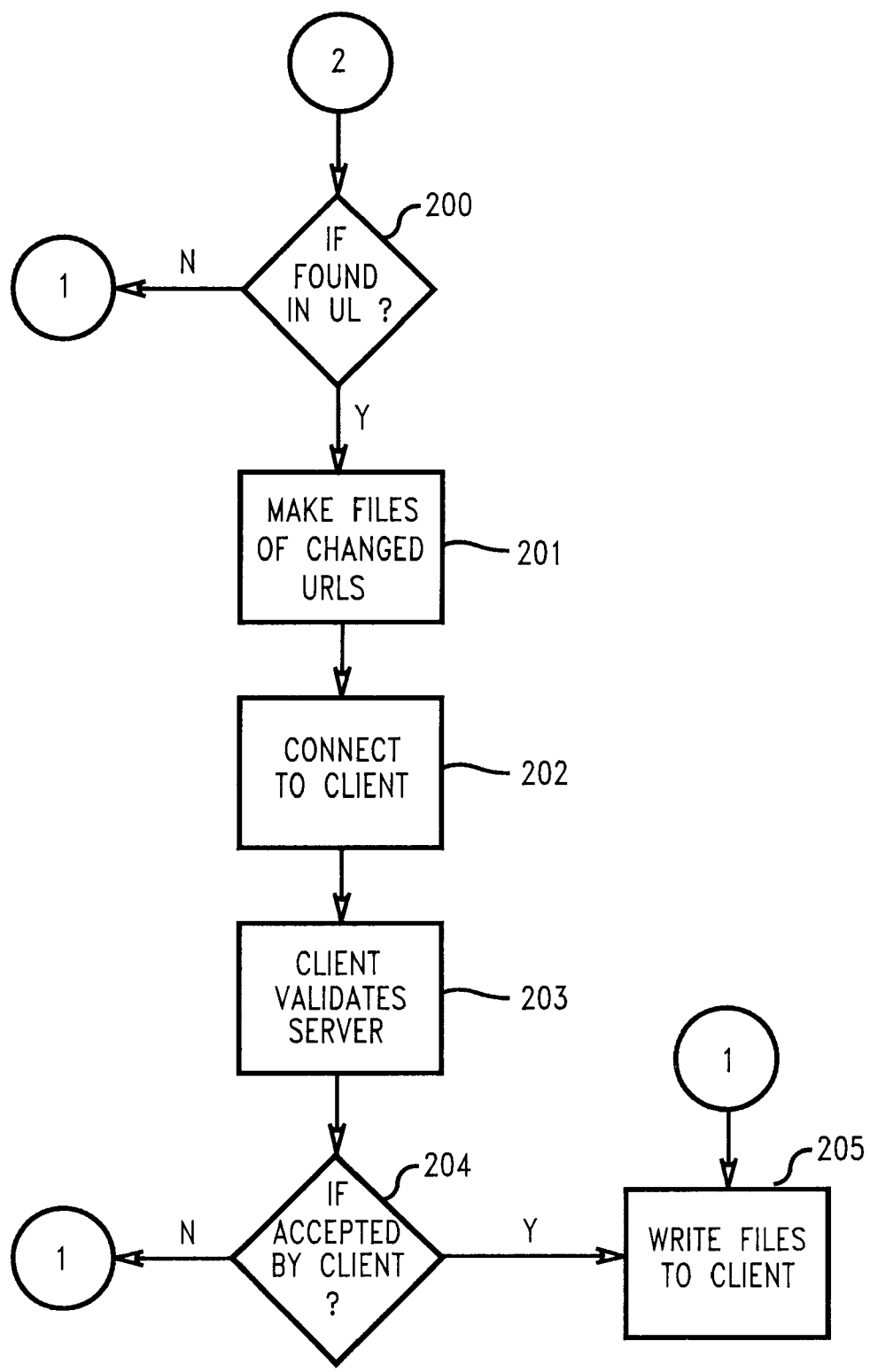

FIGS. 2 and 3 describe the URL address updating operations on the network server, and the flow chart description is as follows:

100—Start the system for server URL processing.
101—Update UL? Is it time to update the unique list?
102—Make unique history list. Use the history list that is generated by the server and copy the list and eliminate all duplicate client addresses and URL combinations.
103—Compare to UL. Compare the unique history list to the unique list and identify all the client addresses and URLs found in the unique history list and not found in the unique list.
104—Update the UL. Add the client addresses and URLs found in the unique history list and not in the unique list to the unique list.
105—Changes made to URL? Does the URL change file contain any entries?
106—Send changes? Is it time to write the changes to the clients who access the URLs? This function can be executed on a schedule from a calendar function or on demand.
107 Compare to; unique list. The URL change file old URLs are compared to the URLs on the unique list.
108—Exit? Do we want to exit the program?
109—Exit. Exit the program?
200—If found in UL? Are there any matches of old URLs in the URL change file that match the URLs in the unique list?
201—Make files of changed URLs. A file is made for each client that is using URL that has changed. The file will contain a record for each unique URL the client is using.
202—Connect to client. Make network connection to each client that is using the changed URL.
203—Client validates server. The network connection from the server is validated by the client to ensure that the server is at the indicated server address, or that the server-is the server that it says it is.
204—If accepted by client? Has the server been successfully validated by the client?
205—Write files to client. The files of changed URLs are written to clients' storage.

Figure 4:
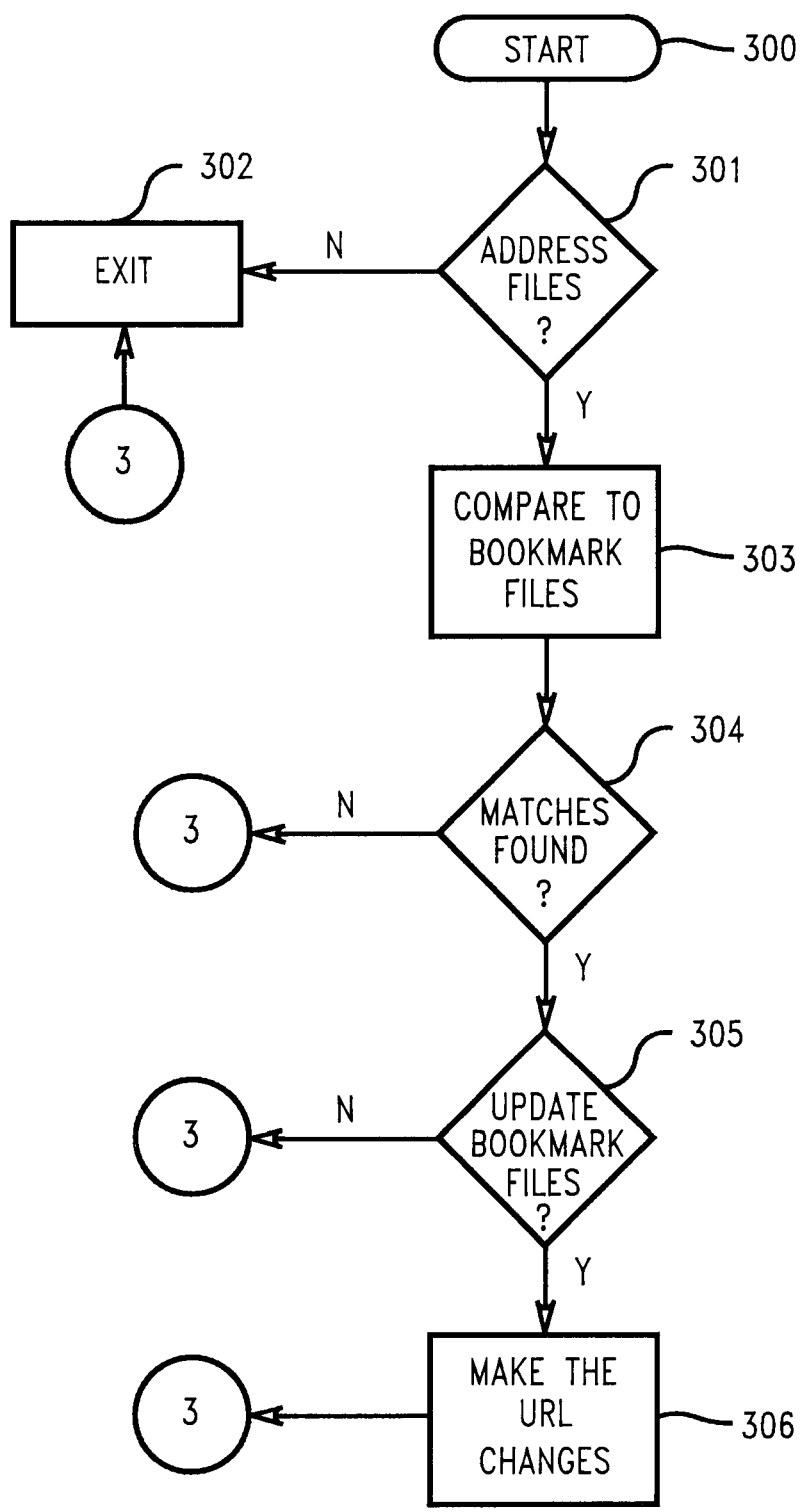

FIG. 4 describes the operations on the client computer server running the web browser, and the flow chart description is as follows:

300—Start. Start the client part of the processing.
301—Address files? Are there any address files that have been written on the clients?
302—Exit. Exit the system.
303—Compare to bookmark files. Compare the address files to the bookmark files to find matches of old URLs in the address files to the URLs in the bookmark files.
304—Matches found? Have matches been found between the address files of URLs and the bookmark URLs?
305—Update the bookmark files? It is time to update the bookmark files? This can be done automatically based on a scheduler on the client or manually by the client user.
306—Make the URL changes. Make the URL changes in the bookmark files and erase the address files.

Figure 5:
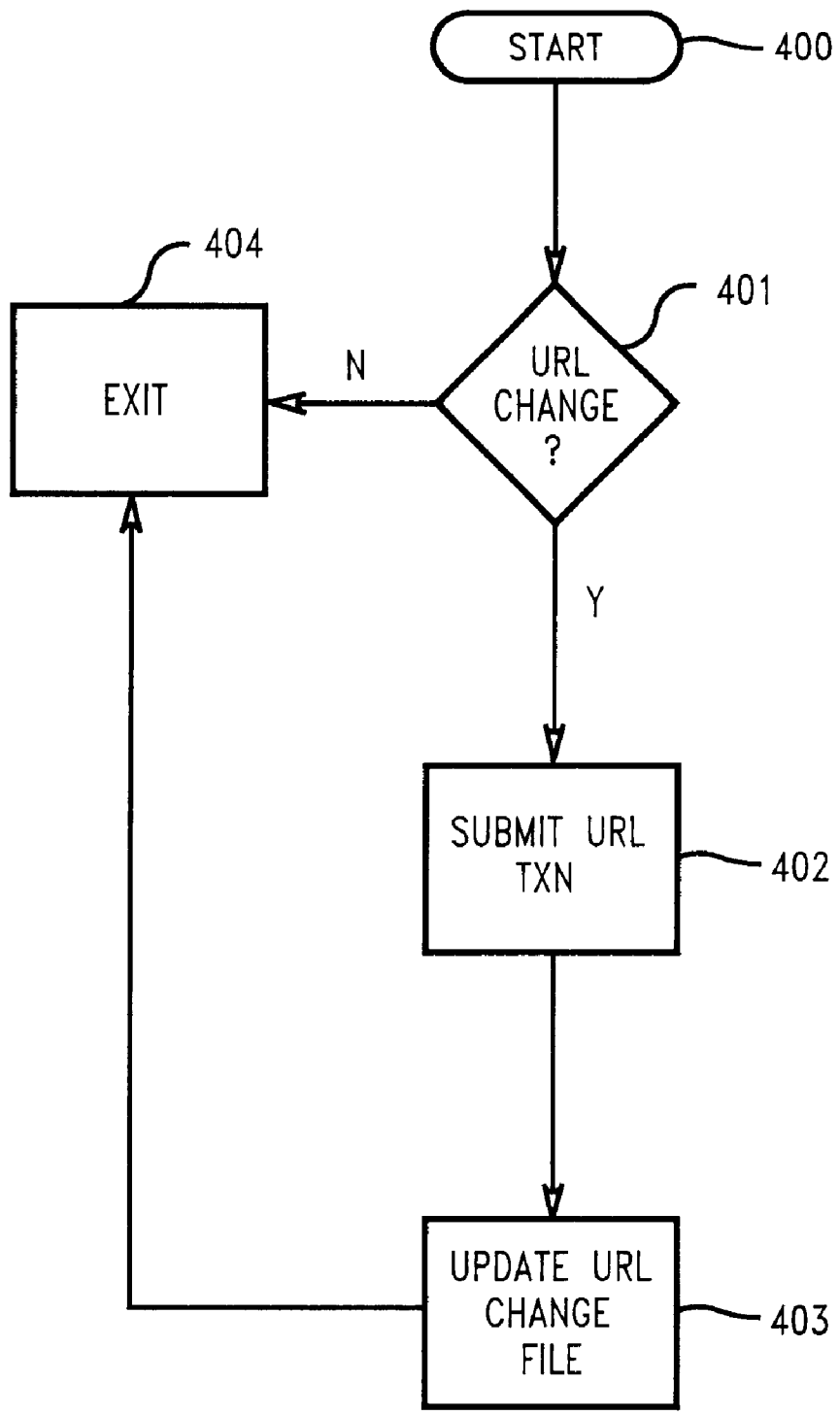

FIG. 5 describes the server processing of a change to a URL, and the flow chart description is as follows:

400—Start. Start the process of documenting the changes to the URL on the server.
401—URL change? Do we want to document changing the URL on the server. This implies that the actual change to the URL has taken place.
402—Submit URL TXN. The owner of the web page submits the transaction to document the change of a URL. The transaction contains the old URL and the new URL.
403—Update URL change file. Make additions to the URL change file to indicate which URLs have changed and the new addresses that they were changed to.
404—Exit. Exit the system.

Accordingly, the present invention provides an efficient process and system for updating desired inter- or intra-net addresses at a client computer in a manner which tracks changes in such addresses. The desired inter- or intra-net addresses are updated without prompting from the client computer, and the system permits verification to a client computer of updates of the desired inter- or intranet addresses.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A process for updating desired Internet addresses at a client computer comprising the steps of:
    a) providing a plurality of client computers, a database accessible by each of said client computers, a network server through which said client computers may access files on the Internet network, and a database accessible by said network server;
    b) providing in the client computer database a unique list of Internet addresses, for each client computer, for accessing desired files on said Internet network by the client computer;
    c) providing in the network server database a list of Internet addresses for said desired files on said network and addresses of said client computers that have accessed said desired files on said network;
    d) receiving notification of new Internet addresses, at the network server, from owners of said desired files;
    e) updating in the network server database at least one of said addresses for said desired files on said network; and
    f) transferring from said network server database to the database of said client computers having addresses in said network server database the updated at least one of said addresses for said desired files on said network.

2. The process of claim 1 further including, between steps (d) and (f), the steps of:
    1) initiating a connection from said network server to said client computers having addresses in said network server database; and
    2) validating said network connection from said client computers having addresses in said network server to said network server to ensure the identity of said network server.

3. The process of claim 1 wherein said database accessible by said client computers initially contains a first address of a desired file on said network, and wherein in step (f) said address of said desired file is changed to a second, updated address.

4. The process of claim 3 further including, after step (f), the steps of:
    1) initiating a connection from said client computers having addresses in said network server database to said network server; and
    2) transferring from said client computers having addresses in said network server to said network server acknowledgment of the change of said address of said desired file.

5. The process of claim 3 including first and second databases accessible by said client computers, and wherein said first database initially contains an address of a desired file on said network, and wherein in step (f) said updated address for said desired files on said network is transferred to said second database.

6. The process of claim 5 further including, after step (f), the step of:
   1) transferring from said second database to said first database said updated address of said desired file.

7. The process of claim 1 further including, between steps (c) and (e), the step of:
   1) creating a change file for new addresses for said desired files prior to updating the database in said network server.

8. The process of claim 7 wherein said step (1) is created after the step of receiving notification of new addresses from owners of said desired files.

9. A process for updating desired Internet addresses at a client computer comprising the steps of:
   a) providing a plurality of client computers, a database accessible by each of said client computers, a network server through which said client computers may access files on the Internet network, and a database accessible by said network server;
   b) providing in the client computer database a unique list of Internet addresses, for each client computer, for accessing desired files on said Internet network by the client computer;
   c) providing in the network server database a list of Internet addresses for said desired files on said network and addresses of said client computers that have accessed said desired files on said network;
   d) receiving notification of new Internet addresses, at the network server, from owners of said desired files;
   e) creating in said network server a change file for new addresses for said desired files prior to updating the database in said network server;
   f) updating in the network server database at least one of said addresses for said desired files on said network;
   g) initiating a connection from said network server to said client computers having addresses in said network server database;
   h) validating the network connection from said client computers having addresses in said network server to said network server to ensure the identity of said network server; and
   i) transferring from said network server database to the database of said client computers having addresses in said network server database the updated at least one of said addresses for said desired files on said network.

10. The process of claim 9 further including, after step (i), the steps of:
    1) initiating a connection from said client computers having addresses in said network server database to said network server; and
    2) transferring from said client computers having addresses in said network server to said network server acknowledgment of the change of said address of said desired file.

11. The process of claim 9 wherein said database accessible by said client computers initially contains a first address of a desired file on said network, and wherein in step (i) said address of said desired file is changed to a second, updated address.

12. The process of claim 11 further including, after step (i), the steps of:
    1) initiating a connection from said client computers having addresses in said network server database to said network server; and
    2) transferring from said client computers having addresses in said network server to said network server acknowledgment of the change of said address of said desired file.

13. The process of claim 11 including first and second databases accessible by said client computers, and wherein said first database initially contains an address of a desired file on said network, and wherein in step (i) said updated address for said desired files on said network is transferred to said second database.

14. The process of claim 13 further including, after step (i), the step of:
    1) transferring from said second database to said first database said updated address of said desired file.

15. The process of claim 14 wherein said step (1) is created after the step of receiving notification of new addresses from owners of said desired files.

16. A system for updating desired Internet addresses at a client computer comprising:
    a plurality of client computers;
    a network server through which said client computers may access files on the Internet network;
    a database accessible by each of said client computers containing a unique list of Internet addresses, for each client computer, for accessing desired files on said network by the client computer; and
    a database accessible by said network server containing a list of Internet addresses for said desired files on said Internet network and addresses of said client computers that have accessed said desired files on said network,
    whereby, upon receipt of notification of new Internet addresses, at the network server, from owners of said desired files, the network server database is adapted to update said addresses for said desired files on said network and transfer to the database of said client computers having addresses in said network server database the updated addresses for said desired files on said network.

17. The system of claim 16 wherein said database accessible by said client computers is adapted to initially contain a first address of a desired file on said network, and wherein upon transfer of updated addresses from said network server database, the database of said client computers is adapted to change said address of said desired file to a second, updated address.

18. The system of claim 16 including first and second databases accessible by said client computers, and wherein said first database is adapted to initially contain an address of a desired file on said network, and wherein upon transfer of updated addresses from said network server database, said updated address for said desired files on said network is adapted to be transferred to said second database.

19. The system of claim 16 further including in the network server database a change file for new addresses for said desired files accessible prior to updating addresses in the database in said network server.

20. A program storage device readable by a machine, tangibly embodying a network server database containing files accessible by a plurality of client computers, the client computers each having a database containing a unique list of Internet addresses, for each client computer, for accessing desired files on the Internet network by the client computer, said device further having a program of instructions executable by the machine to perform a method of updating desired Internet addresses at a client computer, said method comprising the steps of:

a) providing in the network server database a list of Internet addresses for said desired files on said network and addresses of said client computers that have accessed said desired files on said Internet network;

b) determining, at the network server, receipt of notification of new Internet addresses from owners of said desired files;

c) updating in the network server database at least one of said addresses for said desired files on said network; and d) transferring from said network server database to the database of said client computers having addresses in said network server database the updated at least one of said addresses for said desired files on said network.

* * * * *